US009313288B2

(12) United States Patent
Thrasybule et al.

(10) Patent No.: US 9,313,288 B2
(45) Date of Patent: Apr. 12, 2016

(54) NOTIFICATION OF A CHANGE TO USER SELECTED CONTENT

(71) Applicant: INTERNATIONAL BUSINESS MACHINES CORPORATION, Armonk, NY (US)

(72) Inventors: Jacques-Marie Thrasybule, Raleigh, NC (US); Nikhil Parekh, Raleigh, NC (US); Stefanus Wiguna, Cary, NC (US); Tintin Sukawati Soemargono, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 247 days.

(21) Appl. No.: 13/910,437

(22) Filed: Jun. 5, 2013

(65) Prior Publication Data

US 2014/0365578 A1 Dec. 11, 2014

(51) Int. Cl.
*H04L 29/08* (2006.01)
*G06F 17/22* (2006.01)
*G06F 17/24* (2006.01)

(52) U.S. Cl.
CPC ............ *H04L 67/26* (2013.01); *G06F 17/2288* (2013.01); *G06F 17/24* (2013.01)

(58) Field of Classification Search
CPC ..... H04L 67/10; H04L 67/2823; H04L 43/04; H04L 67/26; G06F 17/218; G06F 17/2229; G06F 17/24
USPC ......................................................... 709/205
See application file for complete search history.

(56) References Cited

U.S. PATENT DOCUMENTS

| 6,681,369 | B2 * | 1/2004 | Meunier et al. ................ 715/255 |
| 6,834,306 | B1 | 12/2004 | Tsimelzon |
| 7,117,432 | B1 * | 10/2006 | Shanahan ............. G06F 17/218 707/E17.09 |
| 7,284,191 | B2 * | 10/2007 | Grefenstette ..... G06F 17/30867 707/E17.058 |
| 7,568,151 | B2 | 7/2009 | Bargeron |
| 7,962,853 | B2 | 6/2011 | Bedi |
| 7,975,223 | B2 * | 7/2011 | Plumley .............. G06F 17/2288 715/255 |
| 8,510,266 | B1 * | 8/2013 | Ho et al. ........................ 707/609 |
| 8,799,302 | B2 * | 8/2014 | Singerman et al. ........... 707/758 |
| 2003/0225840 | A1 | 12/2003 | Glassco |
| 2006/0095397 | A1 | 5/2006 | Torres |

* cited by examiner

*Primary Examiner* — Kristie Shingles
(74) *Attorney, Agent, or Firm* — Charles L. Moore; Moore & Van Allen PLLC

(57) ABSTRACT

A system for notification of a change to content of a document may include a processor and a module operable on the processor for allowing a user to dynamically select a variable amount of content of the document for which a notification of a change to the selected variable amount of content is desired. The system may also include a module operable on the processor for detecting a change to the selected variable amount of content being made by another user. The system may additionally include a module operable on the processor for creating the notification of the change to the selected variable amount of content. The system may further include a module operable on the processor for transmitting the notification of the change to the selected variable amount of content in response to the change to the selected variable amount of content of the document being saved by the other user.

21 Claims, 4 Drawing Sheets

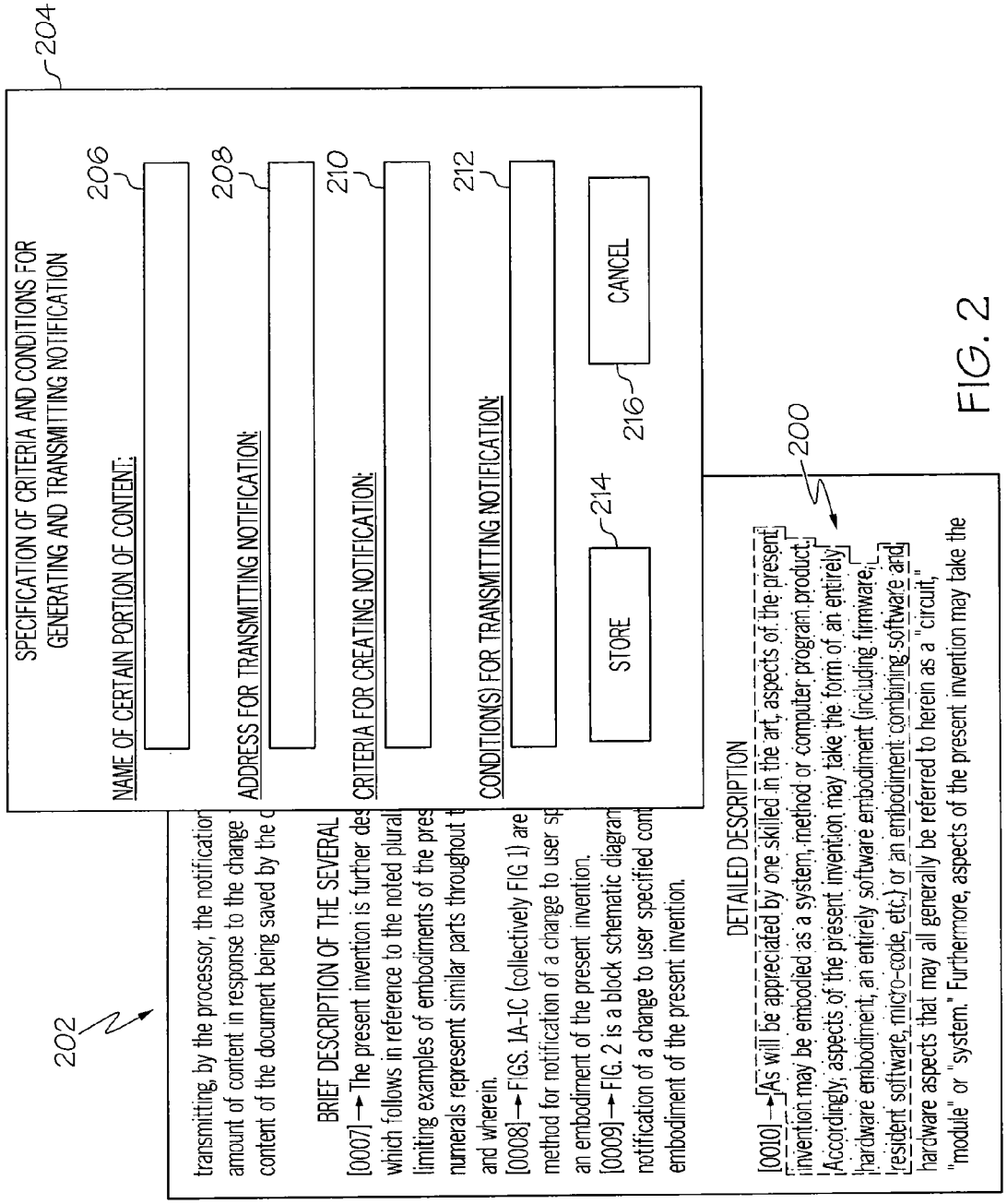

NOTIFICATION OF A CHANGE TO USER SELECTED CONTENT

BACKGROUND

Aspects of the present invention relate to collaborative creation and editing of documents or the like, and more particularly to a method and system for notification of a change to user selected content in a document.

Collaboratively creating documents is becoming common place where multiple authors or editors may collaborate on writing and editing documents including text, spreadsheets, presentations and other types of documents using web based editors. Multiple authors or editors may be responsible for or may contribute to different portions or sections of a document. For example, a sales contract may include sections or portions that a certain group of business people and lawyers may be drafting and there may be other parts or section of the contract which are being drafted by other groups of lawyers and/or business people, such as people from different departments of a company. Normal notification features in most file repositories can notify a user when a change is made to a document. However, the change may be anywhere in the document. The user would have to look through the document to determine where the change is located and precisely what changes were made. This could be tedious depending upon the size of the document. Additionally, the change could be some portion of the document in which the user does not have an interest or concern. Nevertheless, the user would need to read or at least scan through the document to determine whether the changes occurred in a section of interest to the user and if the change itself is of interest or concern to the user. Other known notification features allow users to choose from pre-defined document sections. However when a document is actively edited and growing rapidly, the need for more dynamic and more user-driven selection of content where users can proactively choose a section or portion of a section of interest on-demand for notification becomes increasingly important.

SUMMARY

According to an aspect of the present invention, a system for notification of a change to content of a document may include a processor and a module operable on the processor for allowing a user to dynamically select a variable amount of content of the document for which a notification of a change to the selected variable amount of content is desired. The system may also include a module operable on the processor for detecting a change to the selected variable amount of content being made by another user. The system may additionally include a module operable on the processor for creating the notification of the change to the selected variable amount of content. The system may further include a module operable on the processor for transmitting the notification of the change to the selected variable amount of content in response to the change to the selected variable amount of content of the document being saved by the other user.

According to another aspect of the present invention, a system for notification of a change to content of a document may include a processor and a module operable on the processor for allowing a user to dynamically select a variable amount of content of the document for which a notification of a change to the selected variable amount of content is desired. The user is not required to select a predefined section or block of the content of the document that is a fixed amount of content of the document. The system may also include a module operable on the processor for detecting a change to the selected variable amount of content being made by another user. The system may additionally include a module operable on the processor for creating the notification of the change to the selected variable amount of content. The system may further include a module operable on the processor for transmitting the notification of the change to the selected variable amount of content in response to the change to the selected variable amount of content of the document being saved by the other user.

According to a further aspect of the present invention, a computer program product for notification of a change to content of a document may include a computer readable storage medium having computer readable program code embodied therewith. The computer readable program code may include computer readable program code configured to allow a user to dynamically select a variable amount of content of the document for which a notification of a change to the selected variable amount of content is desired. The computer readable program code may also include computer readable program code configured to detect a change to the selected variable amount of content being made by another user. The computer readable program code may additionally include computer readable program code configured to create the notification of the change to the selected variable amount of content. The computer readable program code may further include computer readable program code configured to transmit the notification of the change to the selected variable amount of content in response to the change to the selected variable amount of content of the document being saved by the other user.

According to a further aspect of the present invention, a method for notification of a change to content of a document may include allowing, by a processor, a user to dynamically select a variable amount of content of the document for which a notification of a change to the selected variable amount of content is desired. The method may also include detecting, by the processor, a change to the selected variable amount of content being made by another user. The method may further include creating, by the processor, the notification of the change to the selected variable amount of content. The method may further include transmitting, by the processor, the notification of the change to the selected variable amount of content in response to the change to the selected variable amount of content of the document being saved by the other user.

BRIEF DESCRIPTION OF THE SEVERAL VIEWS OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein:

FIG. 2 is an example of selection of a certain portion of content in a document and feature for specifying parameters associated with the selected certain portion of content for generating and transmitting a notification in accordance with an embodiment of the present invention.

DETAILED DESCRIPTION

Figure 1A:
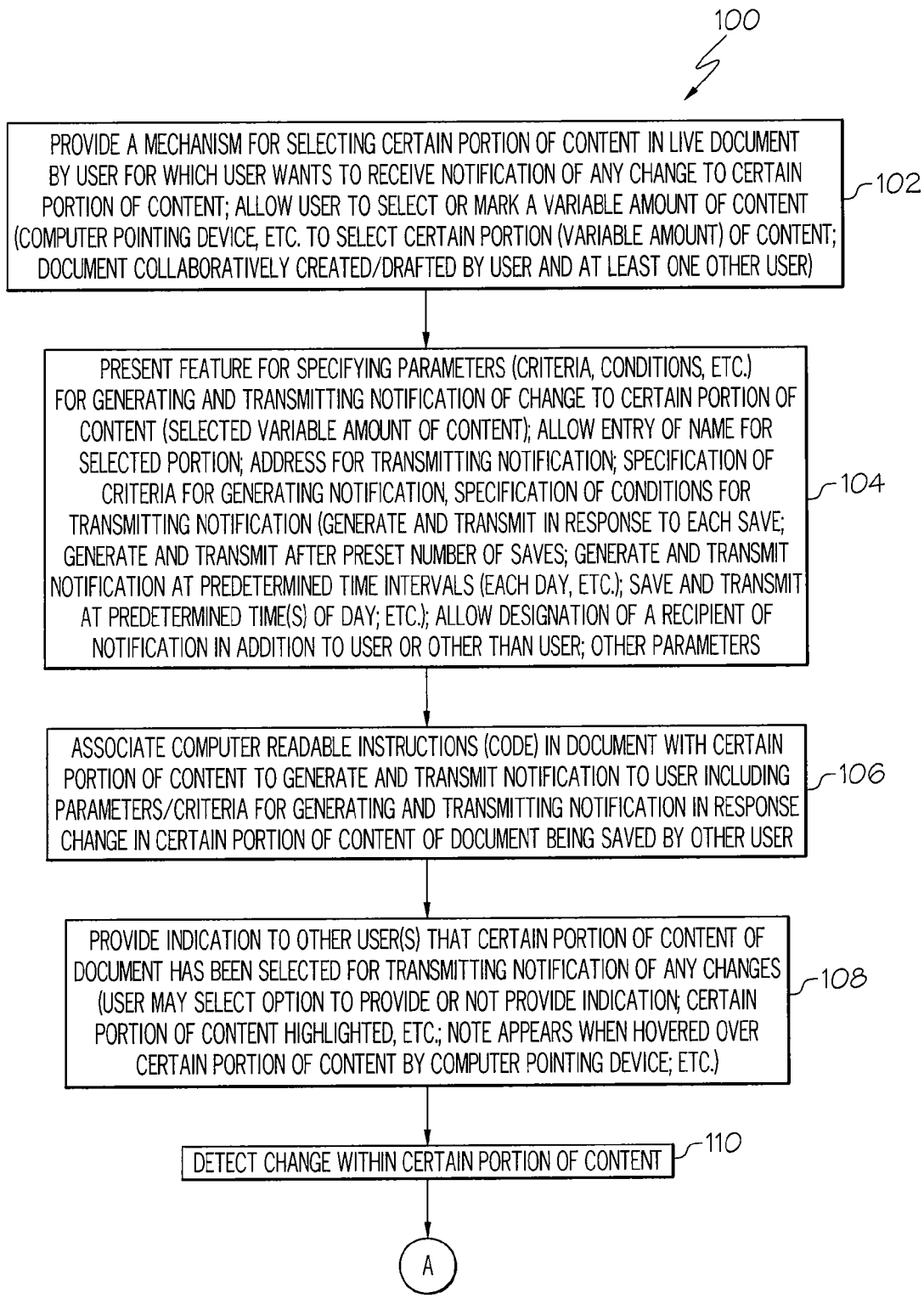
FIGS. 1A-1B (collectively FIG. 1) are a flow chart of an example of a method for notification of a change to user selected content in accordance with an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1B:
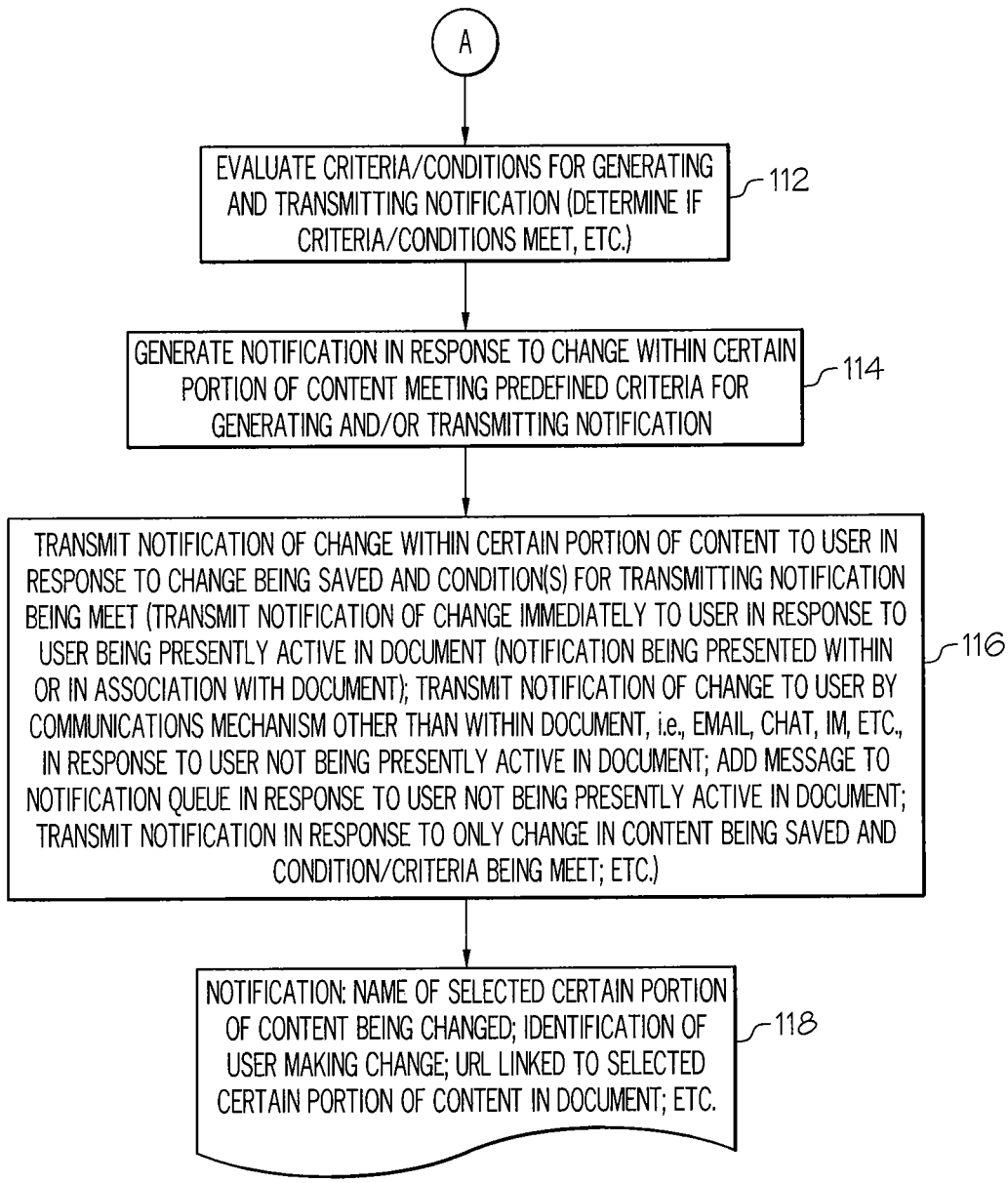

FIGS. 1A-1B (collectively FIG. 1) are a flow chart of an example of a method 100 for notification of a change to user selected content in accordance with an embodiment of the present invention. In block 102, a mechanism may be provided for selecting a certain portion of content of a document by a user for which the user desires to receive notification of a change to the selected certain portion of content. The selected certain portion of content may be a selected variable amount of content of the document. The mechanism may be a computer pointing device or other mechanism that allows a user to dynamically select or mark a variable amount of content in the document for which the notification of a change within the selected variable amount of content is desired by the user. Accordingly, the user is not required to select one or more predefined sections or blocks of content of a document that has been divided into a plurality of predefined sections or blocks that would each define a fixed amount of content of the document. The selected certain portion of content or selected variable portion of content of the document may include but is not limited to at least one of a word or group of words in the document, a cell or group of cells in a spreadsheet, a slide or group of slides in a presentation or a portion of a slide in a presentation. The document may be a live document that is being collaboratively created or drafted by the user and at least one other user, editor or author. A "live document" may be defined as a single document instance that is being edited by one or more users without making copies of the document. Any changes that any user makes happen directly in the one single document. An example of a live document is a single document being edited by multiple users using Google®

Docs. Google and Google® Docs are trademarks of Google, Inc. in the United States, other countries or both.

In block 104, a feature or mechanism may be provided to allow the user to enter or specify parameters useable for generating and transmitting the notification of a change to the selected content. The parameters may include criteria and conditions for generating and transmitting the notification of change. As discussed in more detail herein, the parameters may be stored in the document in association with or linked with the selected content. Examples of parameters that may be associated with the selected content for generating and transmitting the notification of changes to the selected content may include but is not necessarily limited to: a name for the selected content so that the user may be able to quickly determine what or which selected content the notification relates to and may be able to distinguish from other selected content for which the user may also want notification of changes; an address (email address, chat address, instant messaging (IM) address or other address) for transmitting the notification; specification of predefined criteria for generating the change notification; specification of a condition for transmitting the change notification; allow designation of a recipient or recipients to receive the change notification in addition to the user or other than the user; and other parameters that may be helpful with respect to generating and/or transmitting the change notification.

Examples of predefined criteria for generating the change notification may include by is not necessarily limited to: if the selected content is changed by a particular person or group of persons, then send a notification; if the selected content is changed by anyone else do not send do not send a notification or do not send a notification if the change is may by a particular person or group of persons; if a value of a cell in a spreadsheet is changed above or below a chosen value then send the notification; only send notification in response to a certain type of change.

Examples of conditions for transmitting the notification may include but are not necessarily limited to: transmitting the notification in response to each save of a change to the selected portion of content; transmitting the notification after a predetermined number of saves; transmitting the notification at predetermined time intervals, for example, the notification may be transmitted once a day or at predetermined times during a day; or other conditions for transmitting the notification of a change to the selected content.

Referring also to FIG. 2, FIG. 2 is an example of selection of a certain portion of content 200 in a document 202 and a feature 204 for specifying parameters associated with the selected content 200 for generating and transmitting a notification in accordance with an embodiment of the present invention. The selected of content 200 may be highlighted as illustrated in FIG. 2 or otherwise identified as having been selected for generating and transmitting a notification of any changes within the selected content. The feature 204 or mechanism for specifying parameters associated with the selected content for generating and transmitting a notification may include but is not necessarily limited to: a field 206 for entering a name for the selected content so the user can quickly determine what or which selected content the notification relates to and distinguish from other possible portions of content for which the use wants notification of changes, a field 210 for entering a criteria for creating the change notification, and a field 212 for entering a condition or conditions for transmitting the change notification. As previously discussed, the user may specify another recipient or recipients of the change notification other than the user or in addition to the user.

The feature 204 or mechanism for specifying parameters for generating and transmitting a change notification may also include a "STORE" button 214 or similar feature for storing the specified parameters and a "CANCEL" button 216 to cancel the specification of parameters and to close the dialogue box 204.

Referring back to FIG. 1A, in block 106, in accordance with an embodiment, the parameters associated with the user selected content may be stored in the document or with the document. For example computer readable instructions or computer useable instructions or code for generating and transmitting the change notification may be stored in the document in association with the selected content similar to that described herein. Accordingly, a name for the user selected content may be stored within the document in response to the user entering the name and activating a store feature 214 for storing the notification parameters. The address (email address, chat address, IM address, etc.) for transmitting the notification may also be stored within the document in response to the user entering the address for each recipient of the change notification and activating the store feature 214 for storing the notification parameters. Additionally, the predefined criteria for creating the change notification may be stored within the document in response to the user entering the predefined criteria for creating the notification and activating the store feature 214, and a condition or conditions for transmitting the notification may be stored within the document in response to the user specifying the condition or conditions for transmission of the notification and activating the store feature 214 for storing the notification parameters.

In block 108, an indication may be provided to other users that the selected content of the document has been selected by the user for generating and transmitting a notification of any changes to the selected content. An option may be provided for the user to select to provide or not provide the indication. The indication that the selected content has been selected for generating and transmitting a notification of any changes may include highlighting the selected content or otherwise distinguishing the selected content. For example, the indication of change notification may be displayed in response to a computer pointing device hovering over the selected content. In addition to distinguishing or highlighting the selected content, the indication may also include providing an identification of the user that selected the certain portion of content or variable amount of content of the document for receiving notification of changes. This feature may also be turned-on or off by the user when specifying the notification parameters.

In block 110, a change within the selected content may be detected in response to the change being made by another user. If the computer readable instructions or code associated with the selected content and associated notification parameters for generating and transmitting a change notification are stored within the document or in association with the document, this code may also be loaded on any client computer device on which the document is loaded. Accordingly a client computer on which the document is loaded may monitor for any changes to the selected content being made.

In block 112, criteria and/or conditions for generating and transmitting a change notification may be evaluated. In block 114, the notification of the change to the selected content may be generated in response to determining that a change within the selected content meets a predefined criteria for generating and/or transmitting the change notification.

In block 116, the notification of change within the selected content may be transmitted in response to the change being saved by the other user and the condition or conditions for transmitting the change notification being met. The notification of the change to the selected content may be transmitted to the user, to another recipient or recipients or both depending upon what criteria or conditions are specified for transmitting the change notification.

The notification of the change may be transmitted substantially immediately to the user, other recipient or both within the document in response to the user or other recipient being presently in the document. The notification may be presented within the document being viewed by the user or other recipient by superimposing the notification on the document. For example the change notification may be presented in a dialogue box or other arrangement for providing the change notification in association with the document when the user or other recipient has the document open or is working in the document. The user or other recipient may be anywhere in the document when the change notification is displayed or provided.

The change notification may be transmitted to the user or other recipient by a mechanism other than within the document in response to the user or other recipient not being presently in the document or working in the document. For example, the notification of the change may be transmitted by email, chat, IM or other form of communications. The change notification may also involve automatically adding the notification to a notification queue in response to the user not being presently active in the document. The change notification may be generated and transmitted in response to or when only a change in the user selected content is made and when the predefined criteria or conditions are met if specified. For example, generating and/or transmitting the change notification does not require that a comment or annotation be made by the other user with respect to the selected content or any other portion of the document.

The change notification 118 may include but is not necessarily limited to a name of the user selected content that has been changed, an identification of the other user that made the change, and a Uniform Resource Locator (URL). The change in the selected content of the document may be displayed to a recipient of the change notification in response to the recipient activating the URL, for example, clicking-on the URL using a computer pointing device.

Figure 3:
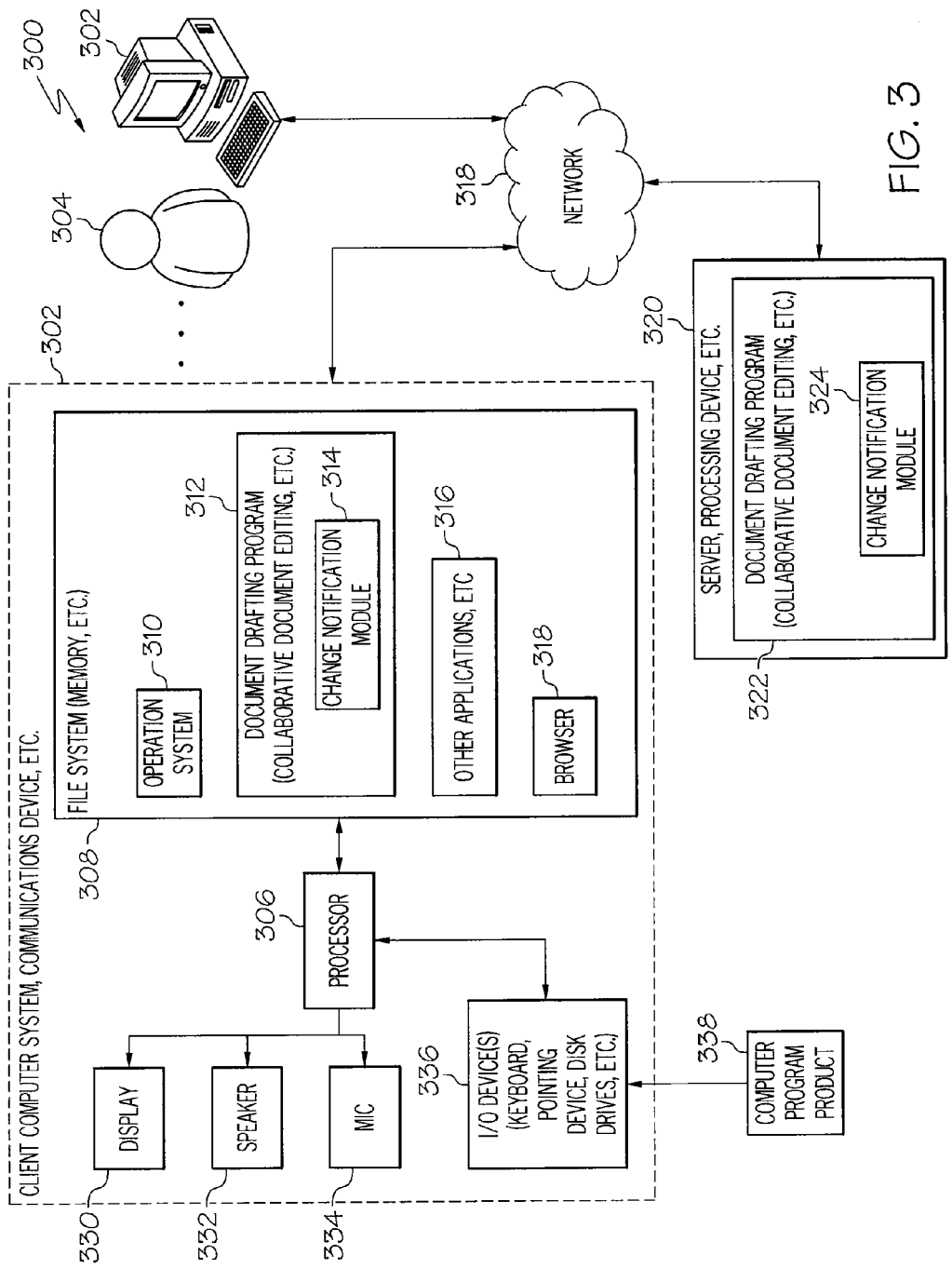
FIG. 3 is a block schematic diagram of an example of a system for notification of a change to user selected content in accordance with an embodiment of the present invention.

FIG. 3 is a block schematic diagram of an example of a system 300 for notification of a change to user selected content in accordance with an embodiment of the present invention. The method 100 described with reference to FIGS. 1A and 1B and other exemplary features described herein may be embodied in or performed by the system 300 or components of the system 300 as described below. The blocks in FIGS. 1A and 1B may be considered modules operating on the system 300 or a processor device of the system 300. The system 300 may include a client computer system 302 for use by a user 304 for selecting a certain portion of content which may be a variable amount of content of a document similar to that described herein. The computer system 302 may be any type of computer device capable of performing the functions or operations described herein.

The computer system 302 may include a processor 306 to control operation of the computer system 302 and a file system 308, memory or similar data storage device. An operating system 310 may be stored on the file system 308 for running or operating on the processor 306. A document drafting software program, app or application 312 may be stored on the file system 308 for operation on the processor 306. The document drafting program 312 may include collaborative document drafting and editing features for collaboratively drafting and editing a live document similar to that described herein.

The document drafting program 312 may include a change notification module 314. The change notification module 314 may be part of the document drafting program 312 as illustrated in FIG. 3 or may be a separate module from the document drafting program 312 but may operate in coordination with the document drafting program 312 to perform the functions or operations described herein. The method 100 in FIGS. 1A and 1B may be embodied, at least in part, in the change notification module 314. The blocks of method 100 may define modules or sub-modules of the change notification module 314.

Other applications 316, software programs or the like may also be stored on the file system 308 for operation on the processor 306. A web or Internet browser 318 may also be stored on the file system 308 for accessing one or more resources, such as a server 320 via the network 318.

In accordance with an embodiment, the server 320 or processing device may include a document drafting program 322 for collaboratively creating and editing documents similar to that described herein. A change notification module 324 may be embodied in the document drafting program 322 as illustrated in FIG. 3 or may be a separate module from the document drafting program 322 but may operate in coordination with the document drafting program 322 to perform the functions or operations described herein. The method 100 may be embodied, at least in part, in and performed by the module 324 or portions of the method 100 may be performed by the module 324 with other portions being performed by other components of the system 300.

The computer system 302 may also include a display 330 for presenting user interfaces, graphical displays as well as other content as described herein. The computer system 302 may also include a speaker system 332 for presenting any audio content. The computer system 302 may additionally include a microphone 334 for the user 304 to aurally communicate via the computer system 302 or control the computer system 302 via voice commands.

The computer system 302 may further include one or more input devices, output devices or combination input/output devices, collectively I/O devices 336. The I/O devices 336 may include a keyboard, pointing device, such as a mouse or other computer pointing device, disk drives and any other devices to permit a user, such as user 304, to interface with and control operation of the computer system 302 and network resources, such as server 320. The program 312 and module 314 may be loaded on the computer system 302 from a computer program product, such as computer program product 338 using one of the input devices 336. The computer program product 338 or a similar computer program product may also be used to load the document drafting program 322 and change notification module 324 on the server 320. The computer program product 338 may be embodied in a form similar that previously described.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to embodiments of the invention in the form disclosed. Many modifications and variations will be apparent to those of ordinary skill in the art without departing from the scope and spirit of embodiments of the invention. The embodiment was chosen and described in order to best explain the principles of embodiments of the invention and the practical application, and to enable others of ordinary skill in the art to understand embodiments of the invention for various embodiments with various modifications as are suited to the particular use contemplated.

Although specific embodiments have been illustrated and described herein, those of ordinary skill in the art appreciate that any arrangement which is calculated to achieve the same purpose may be substituted for the specific embodiments shown and that embodiments of the invention have other applications in other environments. This application is intended to cover any adaptations or variations of the present invention. The following claims are in no way intended to limit the scope of embodiments of the invention to the specific embodiments described herein.

What is claimed is:

1. A system for notification of a change to content of a document, comprising:
   a processor;
   a module operable on the processor for allowing a user to dynamically select a variable amount of content of the document, that is less than all of the content of the document, for which a notification of a change to the selected variable amount of content is desired;
   a mechanism for allowing entry of a name for the selected variable amount of content by the user, wherein the mechanism for allowing entry of the name for the selected variable amount of content is configured for performing a set of additional functions comprising:
      allowing entry by the user of an address for transmitting the notification;
      allowing specification by the user of a predefined criteria for creating the notification; and
      allowing specification by the user of a condition for transmitting the notification;
   a module operable on the processor for detecting a change to the selected variable amount of content being made by another user;
   a module operable on the processor for creating the notification of the change to the selected variable amount of content; and
   a module operable on the processor for transmitting the notification of the change to the selected variable amount of content to the user that dynamically selected the variable amount of content of the document, the notification being transmitted in response to the change to the selected variable amount of content of the document being saved by the other user.

2. The system of claim 1, wherein the module for transmitting the notification of the change comprises:
   a module for transmitting the notification of the change substantially immediately to the user within the document in response to the user being presently in the document; and
   a module for transmitting the notification of the change to the user by a mechanism other than within the document in response to the user not being presently in the document.

3. The system of claim 2, further comprising a notification queue, wherein the notification of the change is automatically added to the notification queue in response to the user not being presently in the document.

4. The system of claim 1, wherein the notification comprises at least one of the name of the selected variable amount of content being changed, an identification of the other user, and a Uniform Resource Locator (URL), wherein the change in the selected variable amount of content of the document is displayed to a recipient of the notification in response to the recipient activating the URL.

5. The system of claim 1, wherein the specification of the condition for transmitting the notification comprises at least one of:
   the notification being transmitted in response to each save;
   the notification being transmitted after a predetermined number of saves; and
   the notification being transmitted at predetermined time intervals.

6. The system of claim 1, wherein the name of the selected variable amount of the content is stored within the document in response to the user entering the name and activating a store feature for storing notification parameters;
   the address for transmitting the notification is stored within the document in response to the user entering the address for transmitting the notification and activating the store feature for storing notification parameters;
   the predefined criteria for creating the notification is stored within the document in response to the user entering the predefined criteria for creating the notification and activating the store feature for storing notification parameters; and
   the condition for transmitting the notification is stored within the document in response to the user specifying the condition for transmission of the notification and activating the store feature for storing notification parameters.

7. The system of claim 1, further comprising an indication being provided to the other user that the selected variable amount of content of the document has been selected for transmitting the notification in response to the change in the selected variable amount of content being saved, wherein the indication comprises an identification of the user that desires the notification of the change in the selected variable amount of content of the document.

8. The system of claim 1, wherein the selected variable amount of content of the document comprises at least one of a word or group of words in the document, a cell or group of cells in a spreadsheet, a slide or group of slides in a presentation or a portion of the slide in the presentation.

9. The system of claim 1, further comprising a module to allow designation of a recipient to receive the notification in addition to the user or other than the user.

10. The system of claim 1, wherein the notification is created and transmitted in response to the change to the selected variable amount of content and without a comment or annotation being made.

11. The system of claim 1, wherein computer readable instructions are added to the document in association with the selected variable amount of content to generate and transmit the notification in response to the change to selected variable amount of content being made and saved.

12. The system of claim 1, wherein the documents is a live document that is a single document instance that is being edited by one or more users without making copies thereof.

13. The system of claim 1, wherein the notification comprises an identification of the other user making the change.

14. The system of claim 1, wherein the notification comprises the name for the selected variable amount of content changed by the other user, the name for the selected variable amount of content distinguishing from another selected variable amount of content of the document selected by the user for receiving a change notification to the content.

15. A system for notification of a change to content of a document, comprising:
a processor;
a module operable on the processor for allowing a user to dynamically select a variable amount of content of the document, that is less than all of the content of the document, for which a notification of a change to the selected variable amount of content is desired, wherein the user is not required to select a predefined section or block of the content of the document that is a fixed amount of content of the document;
a mechanism for allowing entry of a name for the selected variable amount of content, wherein the mechanism for allowing entry of the name for the selected variable amount of content is configured for performing a set of additional functions comprising:
allowing entry by the user of an address for transmitting the notification;
allowing specification by the user of a predefined criteria for creating the notification; and
allowing specification by the user of a condition for transmitting the notification;
a module operable on the processor for detecting a change to the selected variable amount of content being made by another user;
a module operable on the processor for creating the notification of the change to the selected variable amount of content; and
a module operable on the processor for transmitting the notification of the change to the selected variable amount of content to the user that dynamically selected the variable amount of content of the document, the notification being transmitted in response to the change to the selected variable amount of content of the document being saved by the other user.

16. The system of claim 15, wherein computer readable instructions are added to the document in association with the selected variable amount of content to generate and transmit the notification in response to the change to selected variable amount of content being made and saved.

17. A computer program product for notification of a change to content of a document, the computer program product comprising:
a non-transitory computer readable storage medium having computer readable program code embodied therewith, the computer readable program code comprising:
computer readable program code configured to allow a user to dynamically select a variable amount of content of the document for which a notification of a change to the selected variable amount of content is desired;
computer readable program code configured to allow entry of a name for the selected variable amount of content, wherein the computer program code configured to allow entry of the name for the selected variable amount of content is configured for performing a set of additional functions comprising:
allowing entry by the user of an address for transmitting the notification;
allowing specification by the user of a predefined criteria for creating the notification; and
allowing specification by the user of a condition for transmitting the notification;
computer readable program code configured to detect a change to the selected variable amount of content being made by another user;
computer readable program code configured to create the notification of the change to the selected variable amount of content; and
computer readable program code configured to transmit the notification of the change to the selected variable amount of content to the user that dynamically selected the variable amount of content of the document, the notification being transmitted in response to the change to the selected variable amount of content of the document being saved by the other user.

18. The computer program product of claim 17, further comprising:
computer readable program code configured to transmit the notification of the change substantially immediately to the user within the document in response to the user being presently in the document; and
computer readable program code configured to transmit the notification of the change to the user by a mechanism other than within the document in response to the user not being presently in the document.

19. The computer program product of claim 18, wherein the computer readable program code configured to transmit the notification of the change comprises computer readable program code configured to automatically add the notification to a notification queue in response to the user not being presently in the document.

20. The computer program product of claim 18, further comprising computer readable program code configured to add computer readable instructions to the document in association with the selected variable amount of content to generate and transmit the notification in response to the change to selected variable amount of content being made and saved.

21. The computer program product of claim 18, further comprising computer readable program code configured to provide an indication to other users when in the document that the selected variable amount of content has been selected for creating and transmitting the notification of any change to the selected variable amount of content.

\* \* \* \* \*